United States Patent
Zeira

(10) Patent No.: US 7,602,760 B2
(45) Date of Patent: Oct. 13, 2009

(54) RESOURCE ALLOCATION TO USERS IN SLOTTED CODE DIVISION MULTIPLE ACCESS SYSTEMS USING BEAMS

(75) Inventor: Eldad Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 710 days.

(21) Appl. No.: 10/437,164

(22) Filed: May 13, 2003

(65) Prior Publication Data

US 2004/0037263 A1 Feb. 26, 2004

Related U.S. Application Data

(60) Provisional application No. 60/378,161, filed on May 13, 2002.

(51) Int. Cl.
*H04B 7/216* (2006.01)
*H04W 72/00* (2009.01)
*H04B 7/212* (2006.01)
*H04H 20/67* (2008.01)

(52) U.S. Cl. ............... 370/342; 370/442; 455/452.2

(58) Field of Classification Search ............ 370/342, 370/442, 431, 441; 455/450, 452.2
See application file for complete search history.

(56) References Cited

U.S. PATENT DOCUMENTS 5,355,522 A 10/1994 Demange
5,533,013 A 7/1996 Leppanen (Continued)

FOREIGN PATENT DOCUMENTS

DE 19820736 9/1999

(Continued)

OTHER PUBLICATIONS

Toro Inoue et al 2001 IEEE (0-7803-6728-6/01) DS-CDMA and Adaptive Modulation Based TDMA Dual Mode Scheme for High Speed Data Transmission Service in Wireless Multimedia Communication Systems.*

(Continued)

*Primary Examiner*—Patrick N Edouard
*Assistant Examiner*—Michael T Thier
(74) *Attorney, Agent, or Firm*—Volpe and Koenig, P.C.

(57) ABSTRACT

The invention includes several embodiments for slot assignment in code division multiple access communication systems. Some of the embodiments relate to fixed beams and others relate to adaptive arrays. One embodiment for fixed beams assigns slots by first detecting a beam having the best received quality and selected the best slot from that beam. Another fixed beam embodiment determines the best slot or slots in a number of beams and determines the overall best beam/slot combination. Another fixed beam embodiment uses a modified interference factor. One embodiment for the uplink using adaptive arrays using a spatial analysis stage followed by a transmission power level estimation stage. An overall interference level associated with each slot is determined and a slot having the best overall quality is determined. Another embodiment for the downlink uses the spatial analysis and slot assignment of the uplink for the downlink. Another embodiment for the downlink uses a spatial and transmission power level estimation stages. For adaptive arrays, the slot assignment can be determined whether the pathloss for each user is estimated or not and whether signals from each user are received or not.

7 Claims, 11 Drawing Sheets

U.S. PATENT DOCUMENTS

| | | | |
|---|---|---|---|
| 6,212,384 | B1 | 4/2001 | Almgreen et al. |
| 6,356,771 | B1 | 3/2002 | Dent |
| 6,360,077 | B2 | 3/2002 | Mizoguchi |
| 6,408,169 | B1 | 6/2002 | Pallonen |
| 6,453,176 | B1 | 9/2002 | Lopes et al. |
| 6,498,934 | B1 * | 12/2002 | Muller ........................ 455/450 |
| 7,065,383 | B1 * | 6/2006 | Hovers et al. ............ 455/562.1 |
| 2001/0004604 | A1 | 6/2001 | Toshimitsu et al. |
| 2002/0015393 | A1 | 2/2002 | Pan et al. |
| 2002/0077068 | A1 * | 6/2002 | Dent ............................ 455/82 |
| 2002/0101908 | A1 * | 8/2002 | Kim et al. ................... 375/147 |
| 2002/0115474 | A1 | 8/2002 | Yoshino et al. |

FOREIGN PATENT DOCUMENTS

| | | |
|---|---|---|
| EP | 0841826 | 5/1998 |
| EP | 0865172 | 9/1998 |
| EP | 1087630 | 3/2001 |
| GB | 2320648 | 6/1998 |
| JP | 07-193857 | 7/1995 |
| JP | 09-074375 | 3/1997 |
| JP | 2001-238250 | 8/2001 |
| JP | 2001238252 | 8/2001 |

OTHER PUBLICATIONS

Essam Sourour, "Time Slot Assignment Techniques for TDMA Digital Cellular Systems," IEEE Transactions on Vehicular Technology, vol. 43, No. 1, Feb. 1994, pp. 121-127.

Hitoshi Takanashi, Tomoyoski Oono & Toshiaki Tanaka, "Frequency-Segregated Dynamic Channel Allocation for Asynchronized TDMA/TDD Frame Among Base Stations," IEEE, 1996, pp. 933-937.

Mihailescu C. et al., Dynamic Resource Allocation for Packet Transmission in UTMS TDD-CDMA Systems:, Vehicular Technology Conference, 1999 IEEE 49$^{th}$ Houston, TX, USA May 16-20, 1999, Piscataway, NJ, USA IEEE, US, pp. 1737-1741, XP010342115, ISBN: 0-7803-5565-2.

Yoshitaka Hara, Toshihisa Nabetani & Shinsuke Hara, "Time Slot Assignment for Cellular SDMA/TDMA Systems with Antenna Arrays," YRP Mobile Telecommunications Key Technology Research Laboratories Co., Ltd., pp. 1-4, IEEE conference May 6, 2001.

Thit Minn & Kai-Yeung Siu, "Dynamic Assignment of Orthogonal Variable-Spreading-Factor Codes in W-CDMA," IEEE, 2000, pp. 1429-1439.

* cited by examiner

RESOURCE ALLOCATION TO USERS IN SLOTTED CODE DIVISION MULTIPLE ACCESS SYSTEMS USING BEAMS

CROSS REFERENCE TO RELATED APPLICATION(S)

This application claims priority from U.S. provisional application No. 60/378,161, filed on May 13, 2002, which is incorporated by reference as if fully set forth.

FIELD OF INVENTION

The invention relates generally to slotted code division multiple access communication systems. In particular, the invention relates to user time slot and beam assignments in such systems.

BACKGROUND

In addition to using differing frequency spectrums for communication, in code division multiple access (CDMA) communication systems, user communications are separated by the codes used to transmit the communications. In the proposed third generation partnership project (3GPP) wideband code division multiple access (W-CDMA) communication system, the user codes comprise a channelization code and a cell specific scrambling code. Similar arrangements of user or service specific channelization (also called spreading) codes are used in other standards.

In slotted CDMA communication systems, the communications are also separated by time. Each communication for transmission is assigned one or more codes in one or more time slots. In addition in a time division duplex slotted system, uplink and downlink transmissions are separated by assigned time slot.

In slotted CDMA systems, the code/slot assignment is extremely important to the performance of the system. Many factors can degrade the performance of a particular user code/slot assignment, such as interference between neighboring cells, external interferers and interference between users within a cell.

To further enhance the capacity of slotted CDMA system, the use of multiple antenna in cells has grown in interest. These techniques have generally fallen into two categories, fixed and adaptive beamforming. Typically, each beam is generated in such a way that the radiated communication energy is concentrated in a beam and outside of that beam the radiated energy is low. A user located within the beam can easily detect communications transmitted in the beam and users outside the beam are less interfered by signals sent to users in the beam.

In fixed beamforming techniques, the antennas of a cell's base station are configured to transmit communications in multiple fixed beams. These beams are stationary. In adaptive beamforming, beams are formed by adaptive antenna arrays and can be changed. The adaptive beamforming allows for the beams to be moved as the cell loadings change or as users move within a cell.

Beamforming allows for better distinction between individual system users. Not only are the users in a cell distinguished by a time slot and cell, they can also be distinguished by beam. Provided sufficient isolation is achieved, the same codes can be used for different users, thus increasing the capacity of the cell. To illustrate, a user in a first beam may have the same code and time slot assignment as a user in a second beam. These user transmissions are separated by their respective beams.

Although beams allow for additional distinction between users, assignment issues still exist. Individuals within the same beam and bordering on beams can interfere with one another. Users at the peripheries of cells may be located within beams of neighboring cells and, accordingly, interfere with each other.

Accordingly, it is desirable to have efficient time slot and beam assignment schemes in such systems.

SUMMARY

The invention includes several embodiments for slot assignment in code division multiple access communication systems. Some of the embodiments relate to fixed beams and others relate to adaptive arrays. One embodiment for fixed beams assigns slots by first detecting a beam having the best received quality and selected the best slot from that beam. Another fixed beam embodiment determines the best slot or slots in a number of beams and determines the overall best beam/slot combination. Another fixed beam embodiment uses a modified interference factor. One embodiment for the uplink using adaptive arrays using a spatial analysis stage followed by a transmission power level estimation stage. An overall interference level associated with each slot is determined and a slot having the best overall quality is determined. Another embodiment for the downlink uses the spatial analysis and slot assignment of the uplink for the downlink. Another embodiment for the downlink uses a spatial and transmission power level estimation stages. For adaptive arrays, the slot assignment can be determined whether the pathloss for each user is estimated or not and whether signals from each user are received or not.

BRIEF DESCRIPTION OF THE DRAWING(S)

DETAILED DESCRIPTION OF THE PREFERRED EMBODIMENT(S)

Although the preferred embodiments are described in conjunction with a third generation partnership program (3GPP) wideband code division multiple access (W-CDMA) system utilizing the time division duplex mode, the embodiments are applicable to any hybrid code division multiple access (CDMA)/time division multiple access (TDMA) communication system. Additionally, some embodiments are applicable to CDMA systems, in general, using beamforming, such as the proposed frequency division duplex (FDD) mode of 3GPP W-CDMA.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a base station, Node-B, site controller, access point or other interfacing device in a wireless environment.

Figure 1:
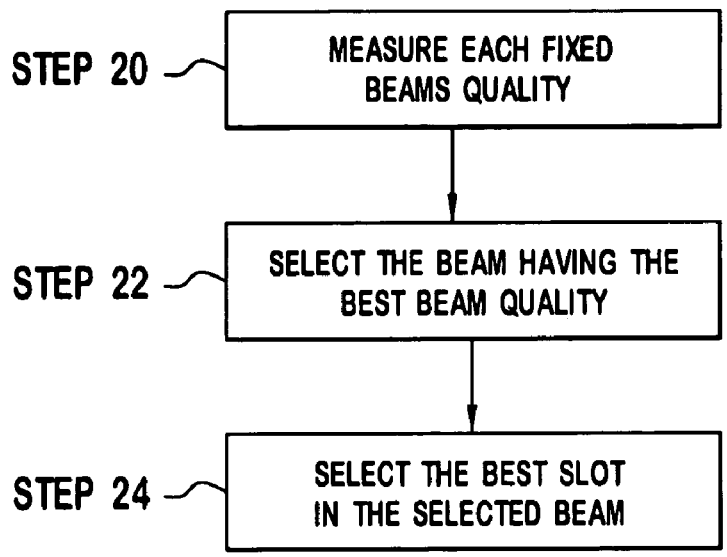
FIG. 1 is a flow chart of an embodiment of assigning slots to fixed beams.
Figure 2:
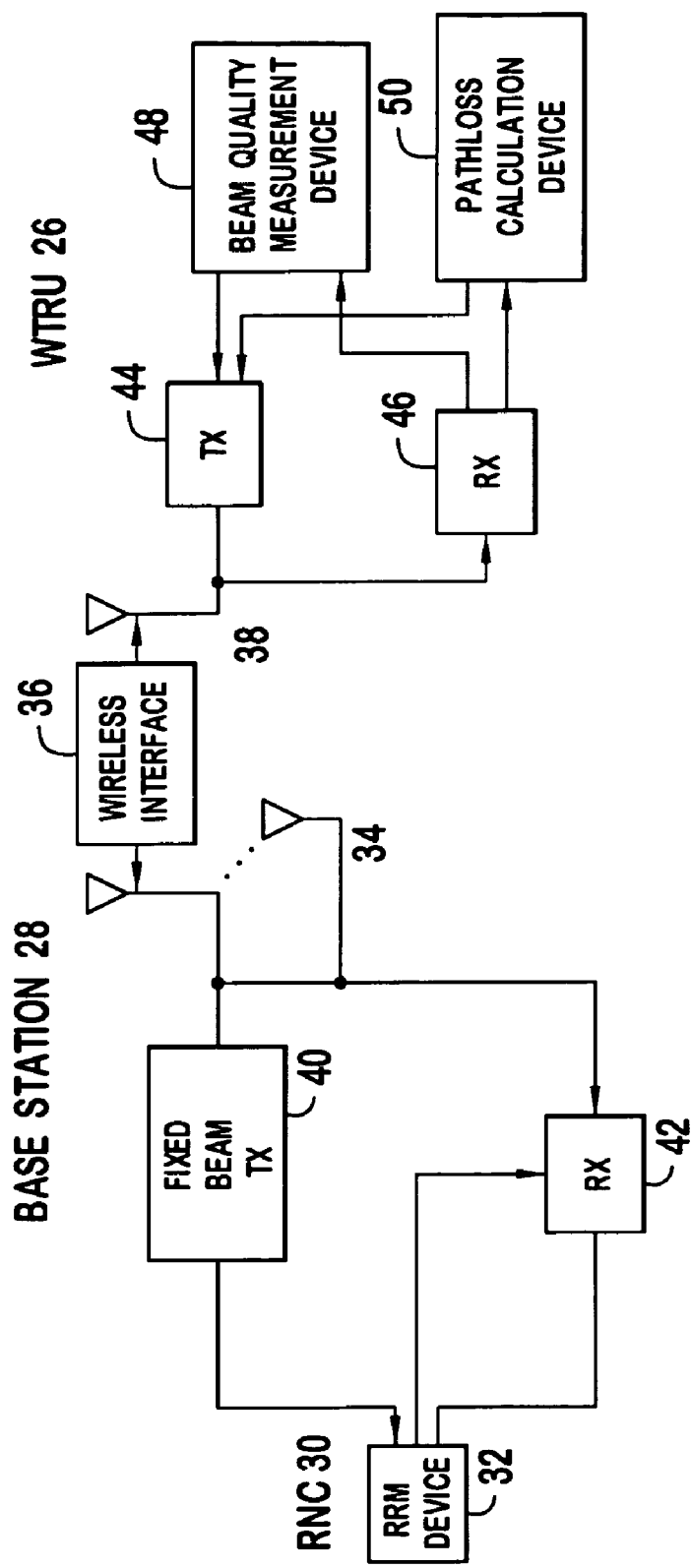
FIG. 2 is a simplified diagram of a system using the flow chart of FIG. 1.

FIG. 1 is a flow chart of beam/slot assignment for a user in a cell having fixed beams. The flow chart of FIG. 1 is described in conjunction with the preferred simplified radio network controller (RNC) 30, base station 28 and WTRU 26 of FIG. 2 and illustrated in FIG. 3. A fixed beam transmitter/receiver 40 at the base station 28 generates the various fixed beams for WTRUs 26 in that base station's cell using its antenna array 34. Initially, the WTRU 26 makes beam quality measurements using a beam quality measurement device 48, step 20. Although the beam quality measurements can be performed by many different approaches, one approach is to measure the received signal power of signals received in the base station 28 over all or several of the beams.

Figure 3:
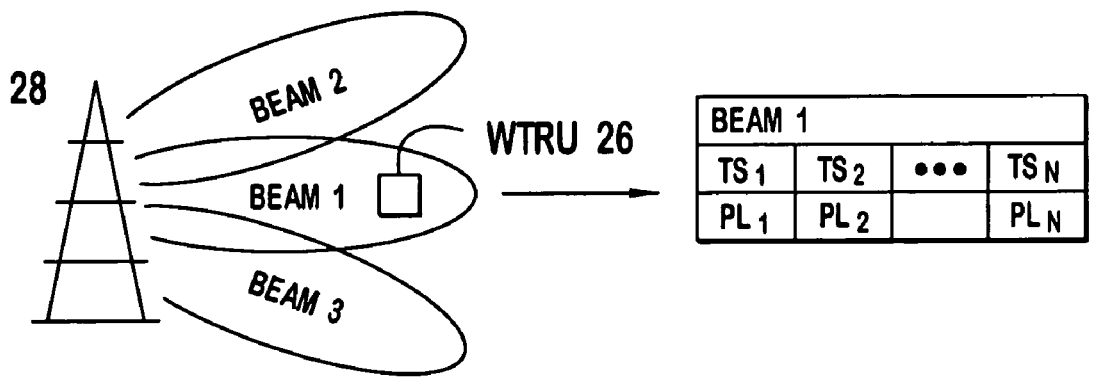
FIG. 3 is an illustration of the embodiment of the flow chart of FIG. 1.

Using the beam quality measurements, a radio resource management (RRM) device 32 in the RNC 30 determines the beam having the best quality for that WTRU 26, step 22. As illustrated in FIG. 3, the WTRU 26 measures the beam quality of beam 1, beam 2 and beam 3. Beam 1 has the best quality (the WTRU 26 is in its boresight) and beam 1 is selected for that WTRU 26. After the beam is selected, the RRM device 32 determines the optimum slot to assign the WTRU 26 within the selected beam, step 24. One approach to determine the optimum slot uses information of the pathloss experienced by the user, as well as measured interference at the WTRU 26 for base station 28, to estimate system noise rise that will be caused by the addition of the user and its transmission power. A slot may be chosen such that the transmit power is minimized. The pathloss may be determined by a beamformed transmission from a non-beamformed transmission, such as over a beacon channel. Although a pathloss calculation from a non-beamformed channel introduces additional error into the pathloss measurement, this error is typically only a few decibels (dB). This error is even less at the center of the beam (antenna boresignt). As a result, using the pathloss measurement from a non-beamformed channel provides only a minor degradation to the calculation and slot assignment. As illustrated in FIG. 3, beam 1 has N available time slots, TS 1 to TS N. The RRM device 32 can determine the optimum slot using the time slot measurements.

The WTRU 26 has a transmitter (TX) 44 and a receiver (RX) 46 for communication through the wireless interface 36. The base station 28 has the fixed beam TX 40 and the RX 42 for communication through the wireless interface 36. An antenna at the WTRU 26 receives and radiates signals.

Figure 6:
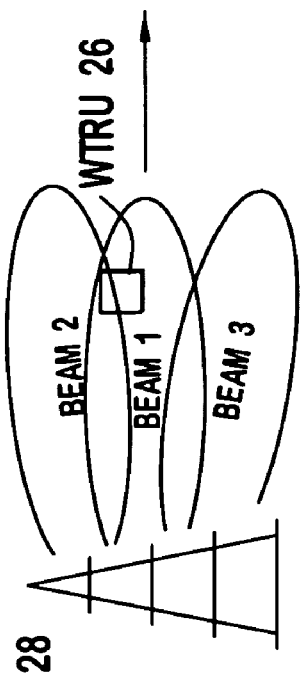
FIG. 6 is an illustration of the embodiment of the flow chart of FIG. 4.

One situation that occurs in cellular systems is that the best available slot may not be located in the best beam. To illustrate, the WTRU 26 as illustrated in FIG. 6 may receive stronger signals from beam 1 than beam 2, but due to beam loading, interference or other reasons, a slot in beam 2 may be a better allocation. This problem is more common at the beam crossover as illustrated in FIG. 6. Using the method of the flow chart of FIG. 4, such a slot in the non-strongest beam is found without an exhaustive search through all slot/beam combinations.

Figure 4:
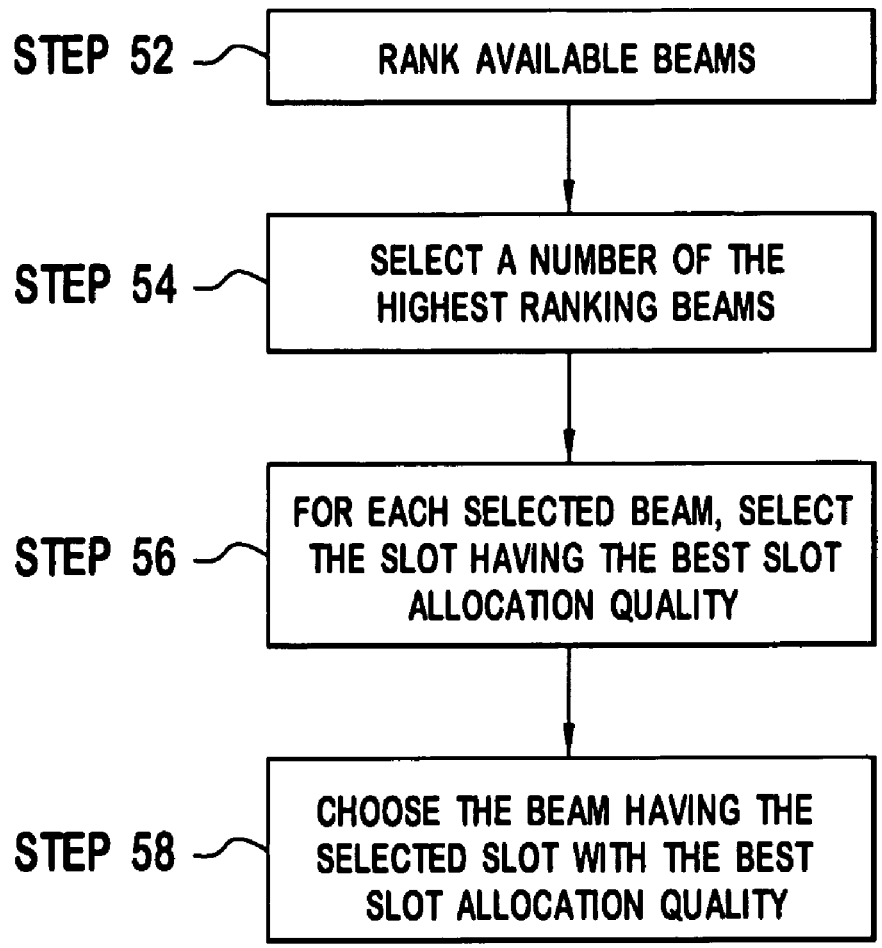
FIG. 4 is a flow chart of another embodiment of assigning slots to fixed beams.
Figure 5:
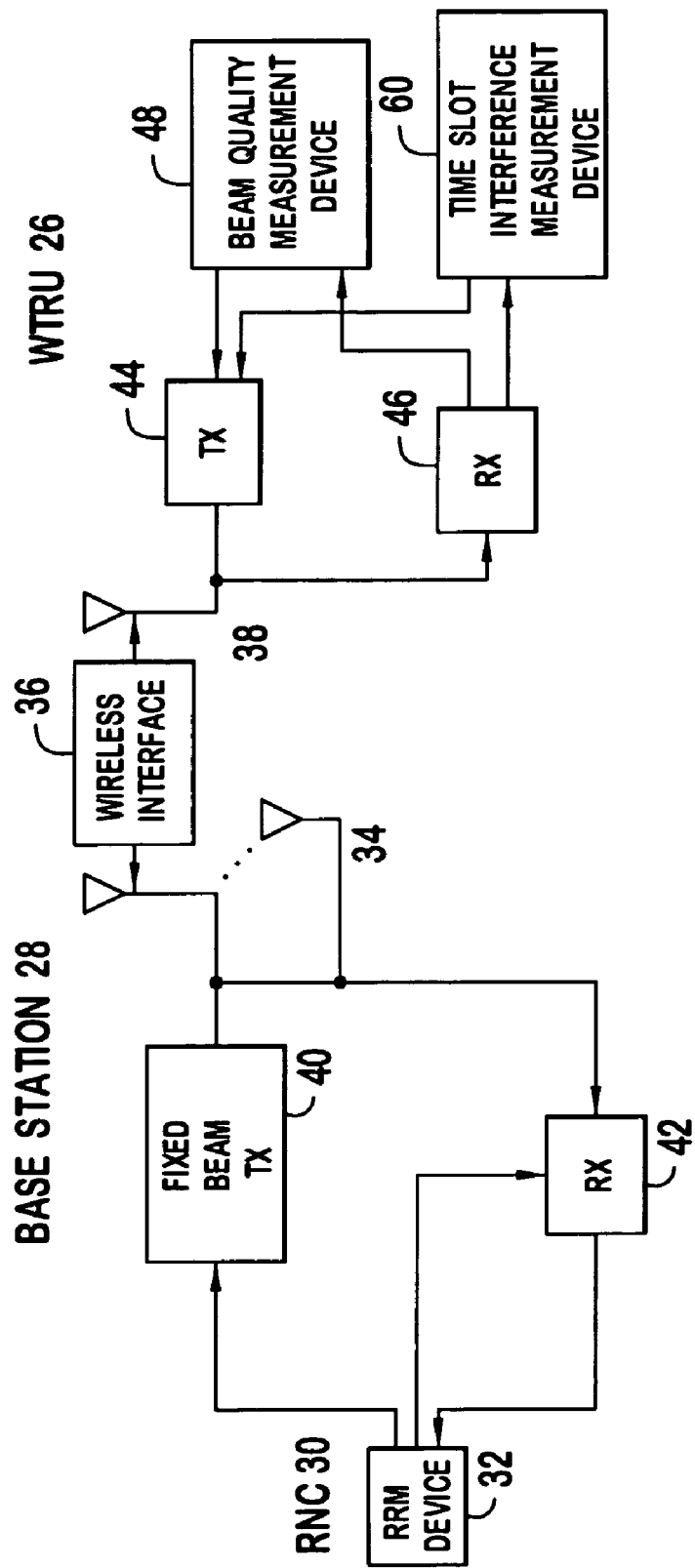
FIG. 5 is a simplified diagram of a system using the flow chart of FIG. 4.

FIG. 4 is another flow chart of beam/slot assignment for cells having fixed beams. The flow chart of FIG. 4 is explained in conjunction with the preferred simplified RNC 30, base station 28 and WTRU 26 of FIG. 5 and illustrated using FIG. 6. The WTRU 26 makes beam quality measurements using a beam quality measurement device 48. The available beams are ranked in order of their quality, step 52. A number, N, of the beams having the highest quality are selected for slot assignment analysis, step 54. The number N can be prespecified, such as two, or the number can be variable. One approach using a variable number is to select all the beams having a quality exceeding a predetermined threshold that may be relative to the highest quality beam. As illustrated in FIG. 6, the WTRU 26 has identified three beams, beam 1, beam 2 and beam 3. The two beams with the highest quality, beam 1 and beam 2, are selected for slot analysis.

For each selected beam, each available slot is evaluated to determine its slot allocation quality, step 56. A more optimal selection can be made by selecting the slot(s) and beam such that the total transmit power or total interference is minimized. The slot(s) having the highest slot allocation quality for each beam is determined and compared to those in other beams, step 58. The beam of the highest slot allocation quality is assigned to the WTRU along with the selected slot for that beam. To illustrate using FIG. 6, the slot allocation quality for each of beam 1's and beam 2's slots is determined. The slot having the highest quality for each beam is selected, such as TS 2 for beam 1 and TS 3 for beam 2. The beam having the selected slot with the highest slot allocation quality is selected for assignment, such as TS 2 for beam 1. The WTRU 26 has a TX 44 and RX 46 and the base station 28 has a fixed beam TX 40 and RX 42 for communication through the wireless interface 36.

Another approach to optimize slot and beam selection can be provided by selecting the best slot(s) in several of the best beams. Using a combined slot/beam factor, the slot/beam combination having the highest overall quality is selected. If multiple slots are required to support communication, multiple slot/beam combinations having the highest overall quality are selected. The selected slots, if multiple slots are selected, may be from different beams. To assign resources to a WTRU's coded composite transport channel (CCTrCH), a slot selection algorithm is performed on the slots using the slots overall quality factor.

Figure 8:
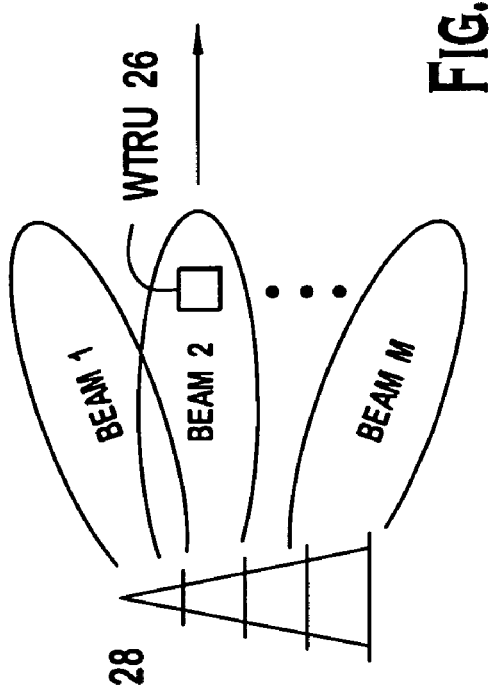
FIG. 8 is an illustration of the embodiment of the flow chart of FIG. 7.
Figure 7:
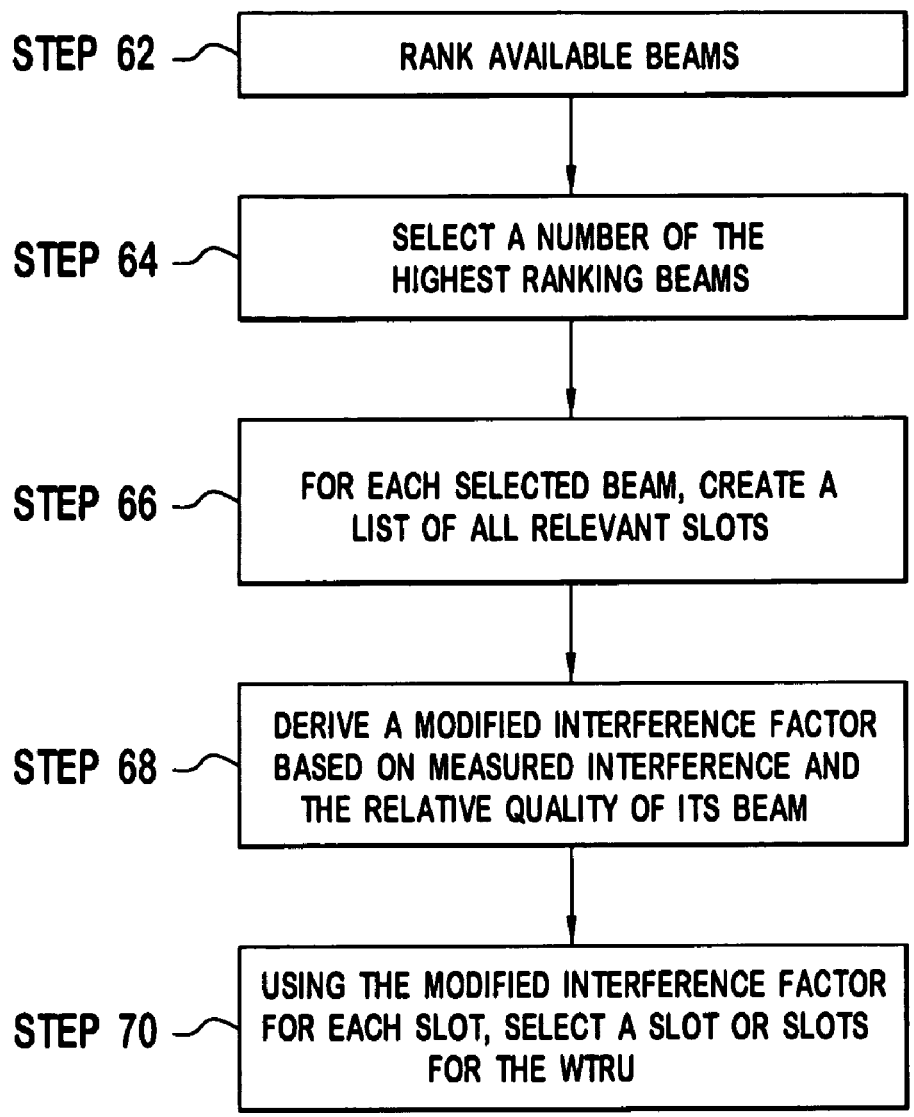
FIG. 7 is a flow chart of another embodiment of assigning slots to fixed beams.

FIG. 7 is another flow chart of beam/slot assignment for cells having fixed beams. The flow chart of FIG. 7 is explained in conjunction with the preferred simplified RNC 30, base station 28 and WTRU 26 of FIG. 5 and illustrated using FIG. 8. The method of FIG. 7 readily allows for time slot assignment over multiple beams. The use of the preferred modified interference factor allows for a quick evaluation of all the slot/beam combinations. The quality of each available beam is determined by a beam quality measurement device 48. The available beams are ranked and a number of beams, N, are selected for slot analysis, steps 62, 64. The number of beams may be a predetermined number, a number of beams exceeding a quality threshold or all of the available beams. As illustrated in FIG. 8, the WTRU 26 detects M beams, beam 1 to beam M, and all M are selected for slot analysis.

For each selected beam, a list of the available time slots is created, step 66. As illustrated in FIG. 8, for each beam, beam 1 to beam M, a list of time slots, TS 1 to TS N are shown. For each time slot, a quality factor is determined. That quality factor is combined with the beam quality measurement to determine the overall quality of assigning that slot/beam combination to the WTRU 26.

One preferred approach uses an interference measurement, $I_{ns}$ for slot s of beam n, as the time slot quality measurement and the received signal power of the beam, $R_n$ for beam n, as the beam quality measurement. The interference may be computed to include an estimated noise rise. The combined factor of the interference measurement and beam quality of slot s is the modified interference measure, $I_{ns}'$, step 68. A preferred Equation for determining $I_{ns}'$ is Equation 1.

$$I_{ns}' = (1-\alpha)I_{ns}\alpha(R_k R_n) \qquad \text{Equation 1}$$

$R_k$ is a reference received signal power value and $\alpha$ is a weighting factor. The values of $R_k$ and $\alpha$ vary based on the implementation and design considerations.

As illustrated in FIG. 8, each beam has an associated received signal power $R_1$ to $R_N$. Each time slot has an associated measured interference level, $I_{11}$ to $I_{MN}$. A modified interference factor, $I_{11}'$ to $I_{MN}'$, for each slot/beam combination is derived using that slot's measured interference level and that beam's received signal power and is used for the selection. Using the combined slot/beam factor, the slot/beam combination having the highest overall quality is selected, step 70.

The purpose of an adaptive array scheme is to maximize the energy transmitted to and received from a desired source while minimizing interference transmitted to and received from other sources. This purpose is achieved by the spatial domain processing of signals to/from multiple antenna elements. Minimizing interference is accomplished by placing nulls in the transmit and receive beam patterns for uncorrelated paths or creating phase cancellation for correlated paths. The angle of maximum energy emanating from or received by the array is considered the beam.

The ability of the array to achieve this purpose depends on its aperture and on its number of antenna elements. The aperture indicates the ability of the array to place a null close to the center of the beam. Typically, nulls can be placed within 0.5 to 2 of the beam's width. The depth of the null depends on its spatial location. The number of antenna elements indicates the number of independent nulls that can be inserted. Typically, E users can be supported using E-1 antenna elements. These elements are commonly separated by a half wavelength. However, multipath tends to degrade the performance of such an array.

System performance is optimized when transmit power or received interference or both are minimized. Therefore, a judicious slot allocation combined with an adaptive antenna optimizes system performance.

Figure 9:
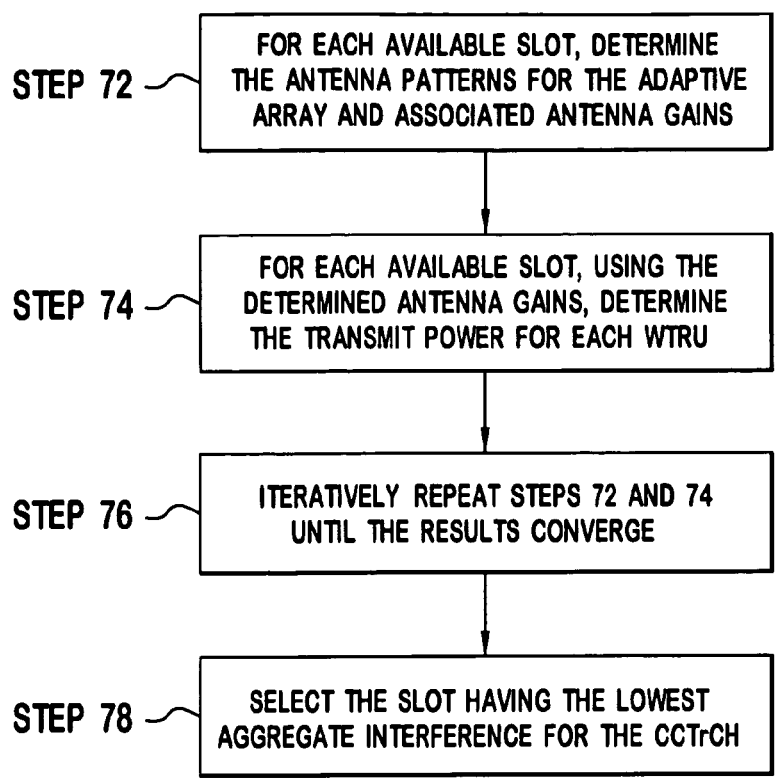
FIG. 9 is a flow chart of an embodiment of assigning slots to adaptive array systems for the uplink.
Figure 10:
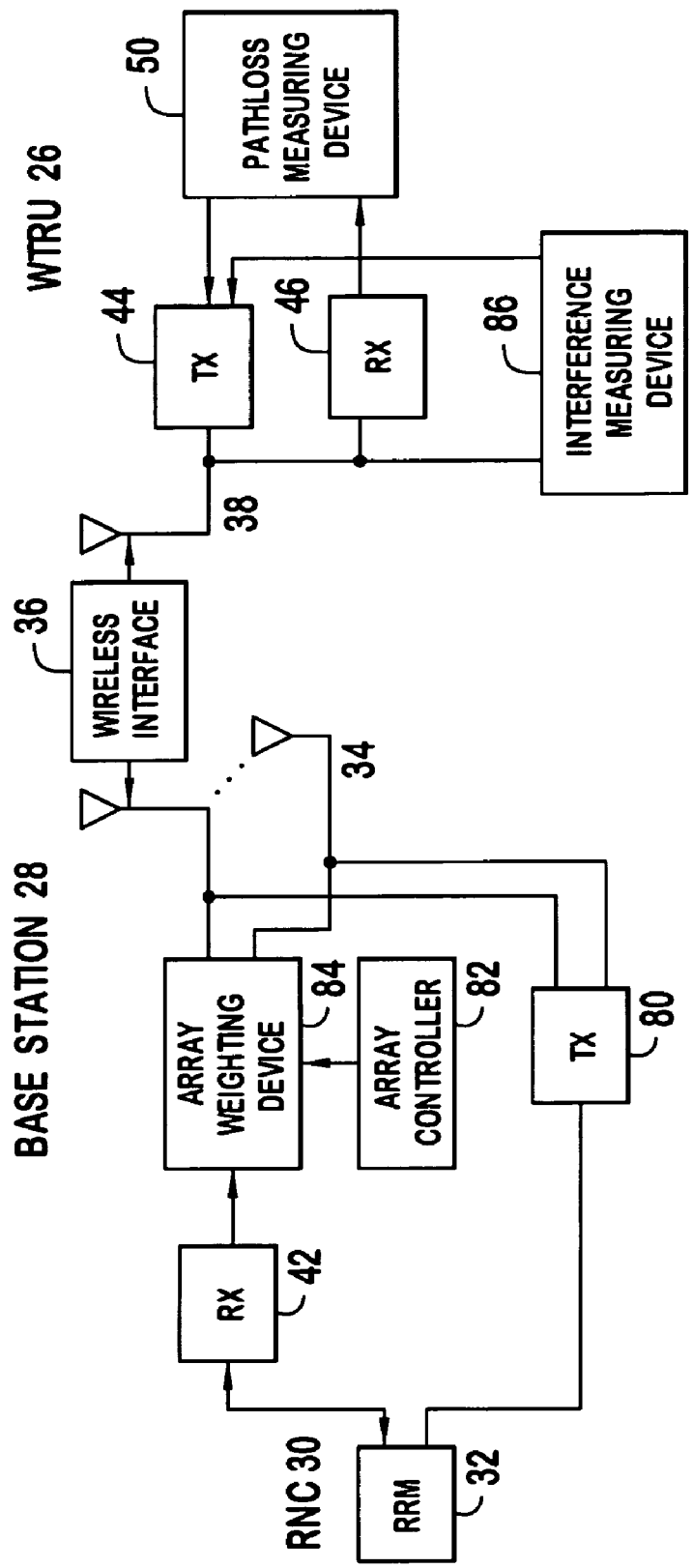
FIG. 10 is a simplified diagram of a system using the flow chart of FIG. 9.

FIG. 9 is a flow chart for assigning uplink slots for systems using adaptive antenna arrays and is explained in conjunction with the simplified RNC 30, base station 28 and WTRU 26 of FIG. 10. The slot allocation algorithm for uplink transmission is composed of two main components: a spatial analysis stage and an optimal power allocation stage. In a typical situation, a user's new physical channel is added to existing physical channels in a slot. The slot selection algorithm for each slot, preferably, iteratively attempts to determine the optimal transmission power of all the users and the resulting optimal antenna complex gain to minimize interference. The slot with minimum interference is selected. The preferred algorithm is as follows for each slot: 1) a spatial analysis stage determines effective antenna gains from each source (of all signals as well as interference); 2) the optimal power allocation stage determines transmit power for all WRTUs 26 and an aggregate interference level in the network; 3) these procedures are repeated until convergence or little change occurs. The slots are arranged in decreasing order of the quality of allocation and a general slot selection algorithm is applied.

Referring back to FIG. 9 initially, for each available uplink slot, the antenna patterns for the adaptive array 34 are determined for that slot, step 72. One approach to determine the antenna pattern for a particular slot is a covariance based algorithm. Covariance based algorithms rely on a covariance matrix of signals and interference at the base station receiver. Different covariance based algorithms are based on different criteria that generally minimizes uplink interference. The uplink interference can include interference within the cell as well as other interferers, such as other cell's base stations. The covariance based algorithms produce a set of weights to be applied to the antenna array. Typically, the covariance matrix is derived by receiving signals in the presence of the interference. To aid in the matrix construction, a known training sequence may be used, although other signals may be used. Since the covariance matrix is typically known at the base station (Node-B), the covariance based algorithm is typically performed at the base station (Node-B).

Another approach to determine the antenna pattern for a particular slot is a direction based algorithm. These algorithms require the knowledge of the direction of arrival and relative power of all signals and the signals' major multipath elements. Adaptive algorithms can be used in the direction based approach and their behavior can be modeled empirically. Accordingly, the equivalent gain for each signal or interference source, including the effects of multipath, can be approximated. One advantage to a direction based approach is that the algorithm can be used prior to receipt of any signal, since correlation information is not used in the algorithm. Since direction based algorithms use received signal strength and the direction of arrival of received signals, these algorithms are typically performed at the base station (Node-B) or RNC.

After the antenna patterns are determined for a particular time slot, the transmission power level for each user is determined, step 74. One approach to determine the transmission power level is as follows and uses the known or estimated antenna gains, step 72, from each WTRU or node. Pathlosses are determined by pathloss measuring devices 50 in WTRU 26 and interference levels in slots are determined by interference measuring device 86.

The transmit power required by each WTRU 26 (node) is determined to satisfy the signal to interference (SIR) requirements of that node's physical channels. For a WTRU k (k $m_{j1}$ 1, 2, ..., $m_j$) connected to base station j (j 1, 2, ..., N), its SIR level, $SIR_k(\xi)$, is expressed per Equation 2.

$$SIR_k(\xi) = \frac{L_{kj}G_{kj}T_u(k)}{N_0 \underset{h1,h\Omega(j)}{\overset{m_N}{f}} L_{hj}G_{hj}T_u(h) \alpha \underset{h1,h\Omega(j),h\zeta k}{\overset{m_N}{f}} L_{hj}G_{hj}T_u(h)} \qquad \text{Equation 2}$$

k for a base station j has a value from $m_{j-1}$ to $m_j$. $m_{j-1}$ is the first WTRU 26 connected to base station j and $m_j$ is the last. $m_N$ is the last WTRU 26 connected to the Nth base station. j has a value from 1 to N. N is the number of base stations of interest. $\Omega(j)$ is the set of WTRUs 26 connected to base station j. $L_{kj}$ is the pathloss between WTRU k and base station j. $G_{kj}$ is the receive antenna gain of WTRU k at base station j. α is the fraction of un-cancelled intra-cell energy at the base station receiver. $T_u(k)$ is the transmit power of WTRU k. $N_0$ is a factor to account for noise or interference not accounted for in the equation.

For simplicity, it is assumed that each WTRU 26 has a single physical channel, although the model is easily adaptable to multiple channels per WTRU 26. $SIR_k$ (ξ) can be a function of the relative path losses of multipath elements and their respective gains.

The equations for all the WTRUs 26 are expressed in matrix form per Equation 3.

$$T_u A S(\xi) \quad \text{Equation 3}$$

A is a $m_N$ by $m_N$ matrix. In matrix A, each diagonal element $A_{kk}$ (1 δ k δ $m_N$) is per Equation 4.

$$A_{kk} L_{kj}(k\Omega(j), j1, 2, \ldots, N) \quad \text{Equation 4}$$

Each non-diagonal element, $A_{kl}$ (k ζ 1, 1 δ k, 1 δ $m_N$), is per Equation 5.

$$A_{kl} \begin{cases} \alpha SIR_k L_{lj} G_{lj}, k\,\Omega(j), l\,\Omega(j) \\ SIR_k L_{lj} G_{lj}, k\,\Omega(j), l\,\Omega(h), j\,\zeta\,h \end{cases} \quad \text{Equation 5}$$

$T_u$ is a 1 by $m_N$ matrix and is per Equation 6.

$$T_u \{T_{u1} T_{u2} T_{um_N} \quad \text{Equation 6}$$

S(ξ) is a 1 by $m_N$ matrix per Equation 7.

$$S(\xi) \{SIR_1 N_0 SIR_2 N_0 SIR_{m_N} N_0. \quad \text{Equation 7}$$

The transmit power is determined per Equation 8.

$$T_u S(\xi) A^1 \quad \text{Equation 8}$$

After the transmission power levels have been determined for each connection, these new transmit power levels may be used in the spatial analysis algorithm to produce a more refined antenna pattern. An array controller 82 estimates, for use by an array weighting device 84, a refined antenna pattern. Iteratively, the transmission power level calculation and the spatial analysis algorithm can be repeated, step 76. Preferably, they are repeated until the results change less than a threshold amount. At that point, the iterations have settled. However, to save processing resources, the iteration may be performed only a single time or a predetermined number of times.

Using the determined $T_u$, the inter-cell interference at each of the base stations is per Equation 9.

$$I_j \underset{h1,h\Omega(j)}{\overset{m_N}{f}} L_{hj} G_{hj} T_u(h) \quad \text{Equation 9}$$

$I_j$ is the interference level at base station j.

The interference over all the base stations is averaged per Equation 10 as a measure of goodness for allocating that time slot.

$$\bar{I} (1/N) \underset{n1}{\overset{N}{f}} I_n \quad \text{Equation 10}$$

The time slot(s) having the lowest average interference $\bar{I}$ is selected by the RRM device 32 to be assigned to the coded composite transport channel (CCTrCH) of the WTRU 26, step 78. The base station 28 has a RX 42 and TX 80 and the WTRU 26 has a RX 46 and TX 44 for communication through the wireless interface 36.

For downlink slot assignments, if the uplink and downlink assignments are symmetrical, the uplink and downlink channel reciprocity can be used for slot assignment. To illustrate, the uplink and downlink loadings are the same (each user has the same number of uplink resource units as downlink resource units). Using the determined uplink time slot assignments and antenna patterns, each downlink time slot is assigned an analogous assignment as the corresponding uplink time slot. The same antenna element weights as the corresponding uplink time slot are used to steer the base station transmitting array. As a result, the slot assignments and the same antenna element weights can be used for the downlink as for the uplink. This symmetrical slot/antenna element weight assignment significantly reduces the processing required for the downlink slot antenna element weight assignment.

Typically, a symmetric assignment of uplink and downlink time slots is not feasible. To illustrate, the downlink for many users may require more resources than the uplink, such as for data downloads. Additionally, in some situations, it may be desirable to independently assign time slots to the uplink and downlink.

One approach to determine the steering vectors takes advantage of the channel reciprocity. Although the uplink and downlink bandwidth for a WTRU 26 may differ, the weights for the uplink beam forming are used to steer the downlink transmissions. Accordingly, the same weights used for the uplink are applied to the downlink transmission for each user. In this method, the power received by each user is optimized, but interference by others is not optimized.

Figure 11:
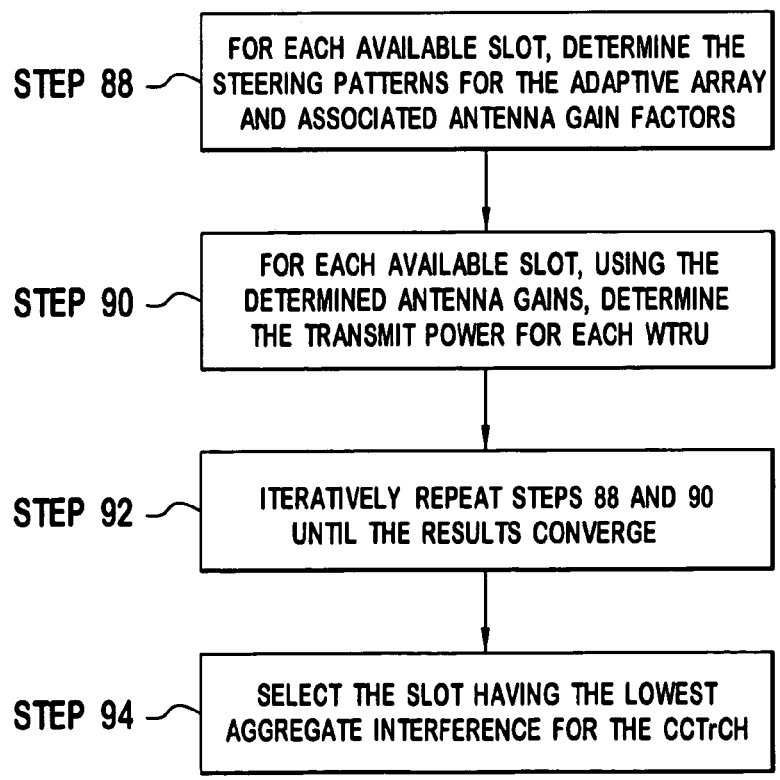
FIG. 11 is a flow chart of an embodiment of assigning slots to adaptive array systems for the downlink.
Figure 12:
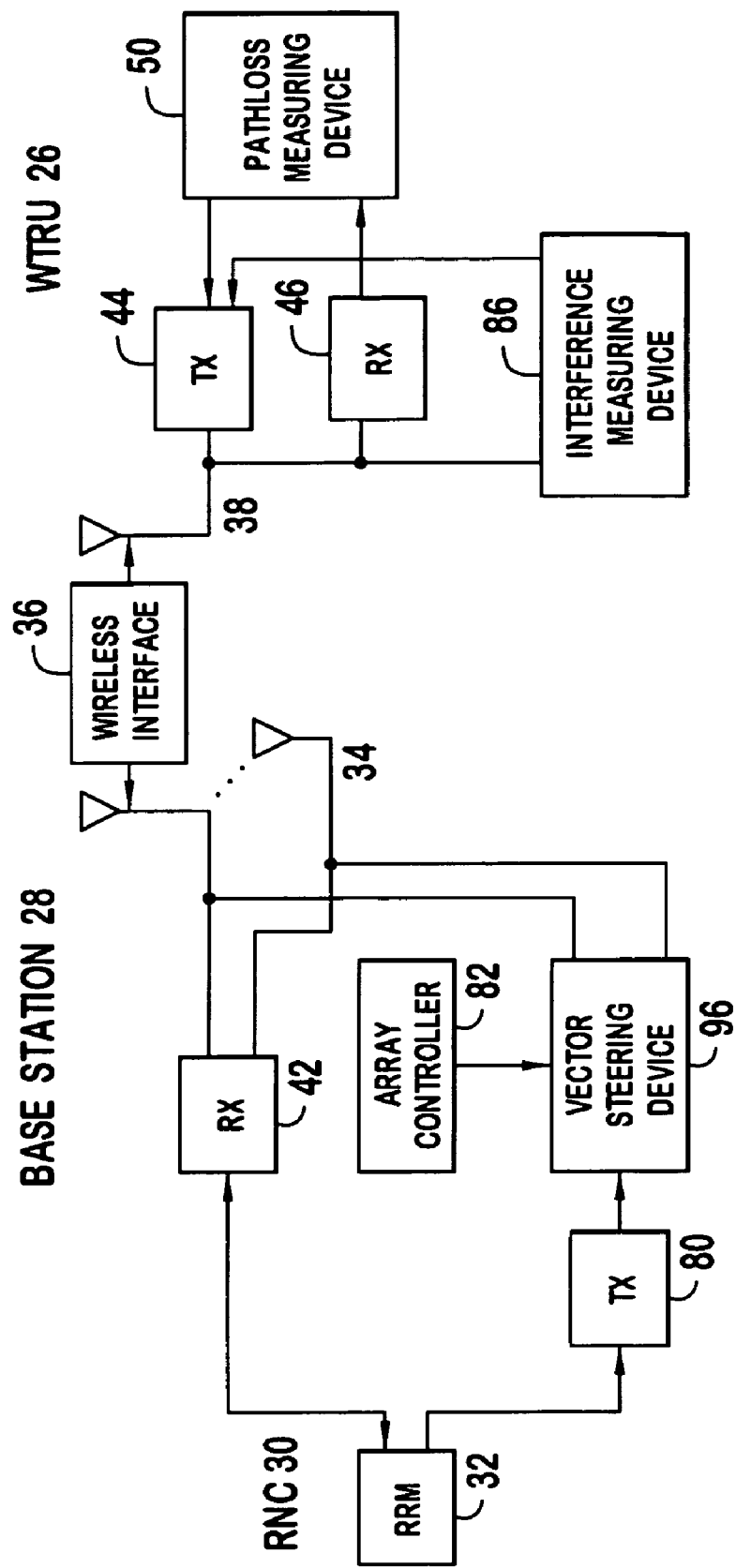
FIG. 12 is a simplified diagram of a system using the flow chart of FIG. 9.

FIG. 11 is a flow chart for assigning downlink time slots without using the uplink assignment and is explained in conjunction with the simplified RNC 30, base station 28 and WTRU 26 of FIG. 12. Initially, for each available downlink slot, the reception steering vectors for the adaptive array 34 are determined for that slot, step 88.

One approach to determine the steering vectors takes advantage of the channel reciprocity. Although the uplink and downlink bandwidth for a WTRU may differ, the weights for the uplink beam forming are used to steer the downlink transmissions. Accordingly, the same weights used for the uplink are applied to the downlink transmissions for each user. In this method, the power received by each user can be optimized, but interference received by others is not optimized.

Another approach uses a direction based algorithm. The direction based algorithm uses the direction of arrival, the relative power level and the major multipath components of signals of the WTRUs. The behavior can be modeled empirically. As a result, the equivalent gain for each signal or interference source, including multipath effects, can be approximately known. The information for direction based algorithms is typically available at the base station (Node-B) and the RNC.

After the steering vectors are determined for a particular time slot, the transmission power level for each user is determined, step 90. One approach to determine the transmission power level is as follows and uses the known or estimated antenna gains for each node. Pathlosses are measured by path loss measuring devices 50 and time slot interference levels by interference measuring devices 86.

The transmit power required by each WTRU 26 (node) is determined to satisfy the signal to interference (SIR) requirements of that node's physical channels. A WTRU k is connected to a base station j. Its SIR, $SIR_k(\xi)$, for WTRU k is per Equation 11.

$$SIR_k(\xi) \frac{L_{kj} G_{kj} T_D(j,k)}{N_0 \underset{h1, h\zeta j}{\overset{N}{f}} L_{kh} \underset{1:(h)}{f} G_{hl} T_D(h,1)}$$
$$\alpha L_{kj} \underset{1:(j),1\zeta k}{f} G_{jl} T_D(j,1)$$

Equation 11

N is the number of base stations 28 of interest. $\Omega(j)$ is the set of WTRUs 26 connected to base station j. $L_{kj}$ is the pathloss between WTRU k and base station j. $G_{kj}$ is the transmit antenna gain in the direction of WTRU k at base station j. $\alpha$ is the fraction of un-cancelled intra-cell energy at the WTRU receiver. $T_D(i,k)$ is the transmit power of base station j for WTRU k.

For simplicity, it is assumed that each WTRU 26 has a single channel, although the model is easily adaptable to multiple channels per WTRU 26. $SIR_k(\xi)$ can be a function of the relative path losses of multipath elements and their respective gains.

The equations for all the WRTUs 26 are expressed in matrix form per Equation 12.

$$T_u BS'(\xi) \qquad \text{Equation 12}$$

B is a $m_N$ by $m_N$ matrix. In matrix B, each diagonal element, $B_{kk}$ (1 δ k δ $m_N$), is per Equation 13.

$$B_{kk} G_{kj} L_{kj}, k\Omega(j), j1,2,,N \qquad \text{Equation 13}$$

Each non-diagonal element, $B_{kl}$ (k ζ1, 1 δ k, 1 δ $m_N$) is per Equation 14.

$$B_{kl} \begin{cases} \alpha SIR'_k L_{kj} G_{kj}, k\,\Omega(j), l\,\Omega(j), k\,\zeta\,l \\ SIR'_k L_{kh} G_{kh}, k\,\Omega(j), l\,\Omega(h), h\,\zeta\,j \end{cases} \qquad \text{Equation 14}$$

$T_D$ is a 1 by mN matrix and is per Equation 15.

$$T_D \overset{>}{} T_D(1,1) T_D(1,2) T_D(N, m_N) \overset{\hat{}}{=} \qquad \text{Equation 15}$$

$S'(\xi)$ is a 1 by $m_N$ matrix and is per Equation 16.

$$S'(\xi) \blacktriangleleft SIR_1' N_0 SIR_2' N_0 SIR_{m_N}' N_0. \qquad \text{Equation 16}$$

Since the matrix B will always have a full rank, an inverse matrix B exists. Accordingly, the transmit power is determined per Equation 17.

$$T_D S'(\xi) B^1 \qquad \text{Equation 17}$$

After the transmission power levels have been determined for each connection, these new transmit power levels may be used in the spatial analysis algorithm to produce a more refined antenna pattern. Iteratively, the transmission power level calculation and the spatial analysis algorithm can be repeated, step 92. Preferably, they are repeated until the results change less than a threshold amount. At that point the iterations have settled. However, to save processing resources, the iteration may be performed only a single time or a predetermined number of times.

Using the determined $T_D$, the inter-cell interference at each of the base stations is per Equation 18.

$$I_k \underset{h1, h\zeta j}{\overset{N}{f}} L_{kh} \underset{1:(h)}{f} G_{hj} T_D(h,1) \qquad \text{Equation 18}$$

$I_k$ is the interference level at base station j.

The interference over all the base stations is averaged per Equation 19 as a measure of goodness for allocating that time slot.

$$\bar{I}(1/m_N) \overset{m_N}{\underset{k1}{f}} K_k I_k \qquad \text{Equation 19}$$

K is a weight factor preferably determined by priority.

The time slot having the lowest average interference $\bar{I}$ is selected to be assigned to the CCTrCH of the WTRU 26 by the RRM device 32, step 94. The base station 28 has a RX 42 and TX 80 and the WTRU 26 has a RX 46 and TX 44 for communication through the wireless interface 36.

In some applications, the pathloss between nodes is not known for most WTRUs 26 and base stations 28. However, the pathloss between the WTRU to be added to its target cell is known. Approximate algorithms can be used for this situation that approximate the exact global interference by a statistical approximate measure based on known pathloss to the new WTRU 26.

If the uplink allocation is known, the downlink allocation can follow it in a same manner to the embodiments where the pathlosses are known. Similarly, if the downlink allocation is known, the uplink allocation can follow it using the embodiments where the pathlosses are known.

Figure 13:
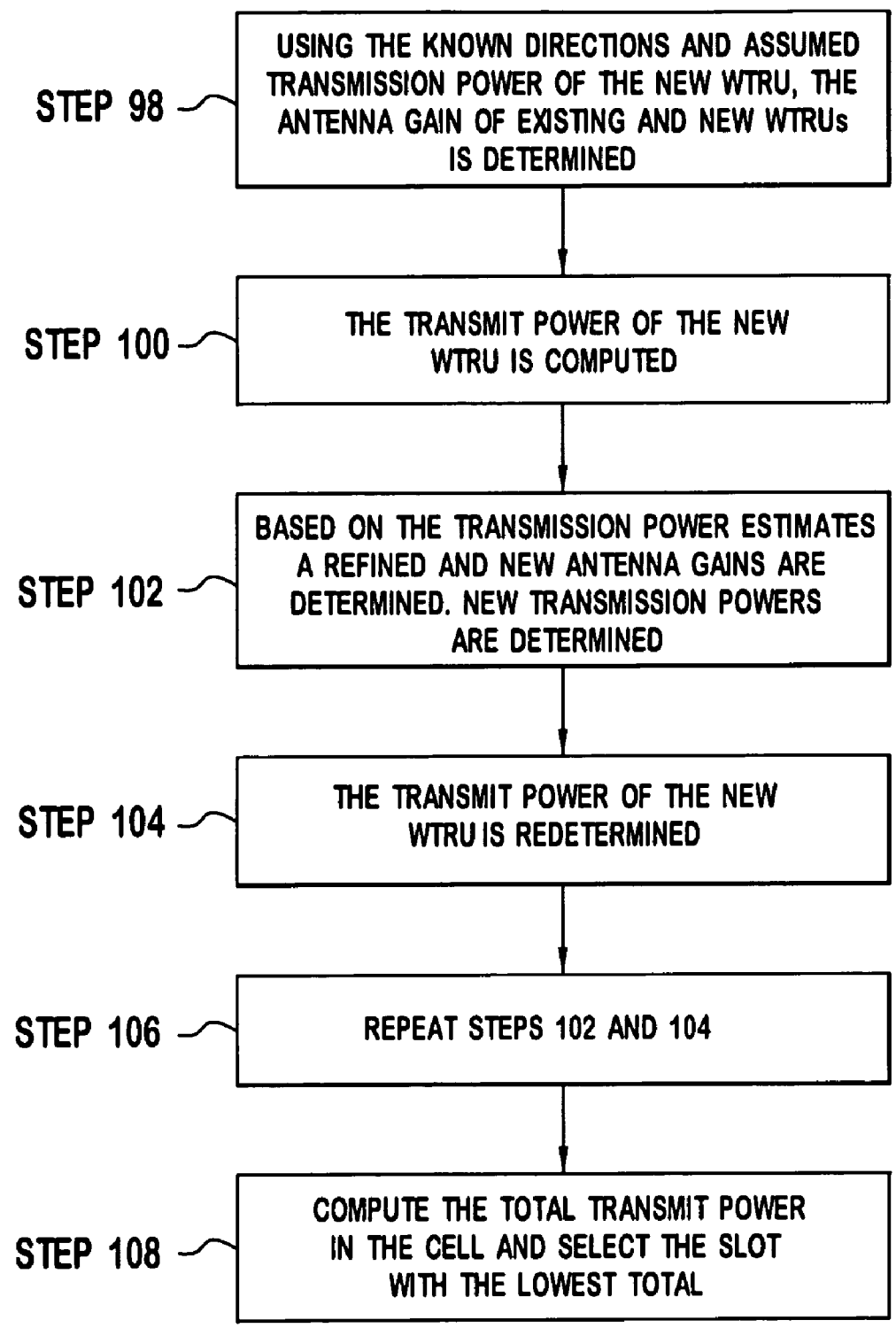
FIG. 13 is a flow chart for downlink allocation without knowledge of the uplink allocation.

FIG. 13 is a flow chart for downlink allocation without knowledge of the uplink allocation. The downlink allocation can be determined, if the pathloss between the new WTRU 26 and its target base station 28 are known and all WTRUs' signals have been previously received so that their direction is known. An iterative process is performed as follows. Using the known directions and assumed transmission power of the new WTRU 26, the antenna gain of existing and the new WTRU 26 is determined, step 98. The transmit power of the new WTRU 26 is computed preferably taking into account the pathloss, interference at the user and required SIR, step 100. The estimation of transmit power may take into account factors of the adaptive antenna system, such as the resulting beamwidth. Based on the transmission power estimate, a refined and new antenna gains are determined. New transmission power levels are then determined for all existing WTRUs 26, step 102. The transmit power of the new WTRU 26 is redetermined, step 104. The estimation of the transmit power may take into account factors of the adaptive antenna system, such as the resulting beamwidth. Steps 102 and 104 are repeated until they converge or little change occurs, step 106. The total transmit power in the cell is computed and the slot with the lowest total transmit power is selected, step 108.

Figure 14:
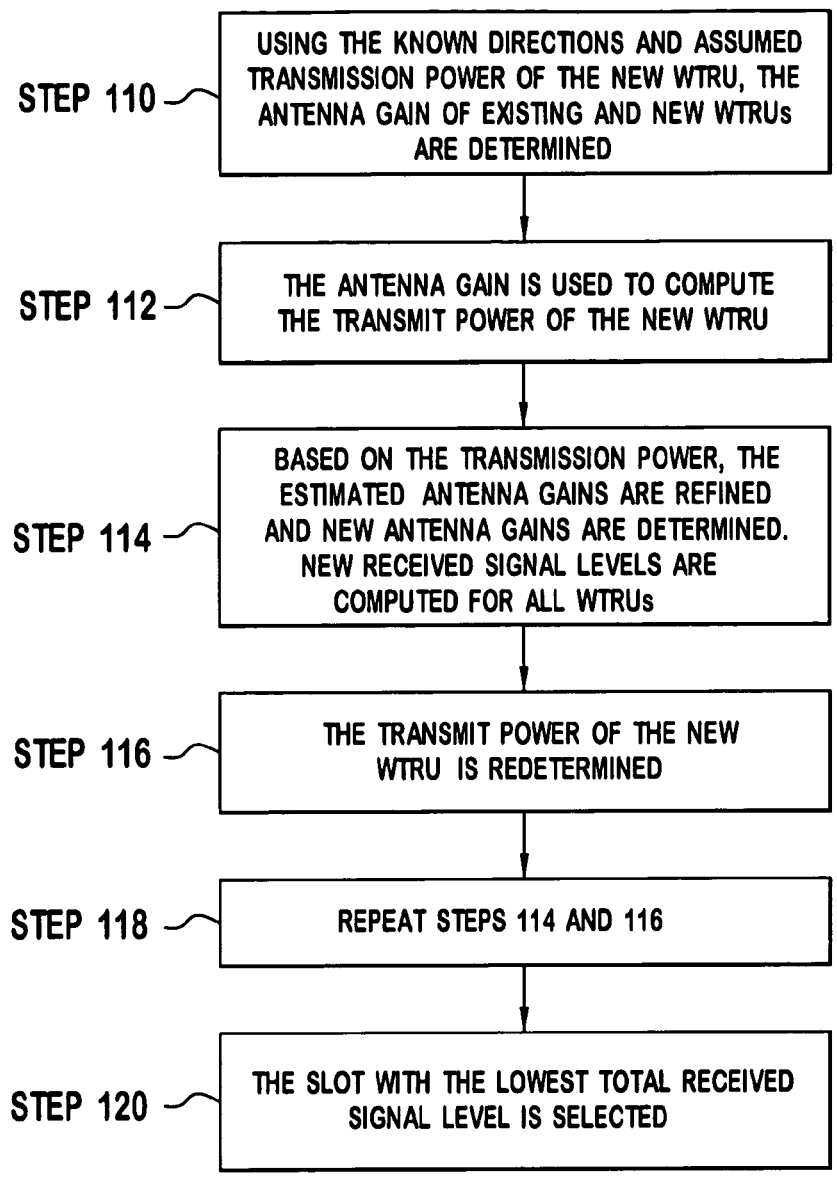
FIG. 14 is a flow chart of uplink allocation without knowledge of the downlink allocation.

FIG. 14 is a flow chart of uplink allocation without knowledge of the downlink allocation. If the pathloss between the new WTRU 26 and its target base station 28 are known and all WTRUs' signals have been previously received so that their direction is known, an iterative process can be used.

Using the known directions and assumed transmission power of the new WTRU 26, the antenna gain of existing and new WTRUs 26 are determined, step 110. The antenna gain is used to compute the transmit power level of the new WTRU 26, preferably taking into account the pathloss, interference at the WTRU 26 and required SIR, step 112. The estimation of transmit power level may take into account factors of the adaptive antenna system, such as the resulting bandwidth. Based on the transmission power, the estimated antenna gains are refined and new antenna gains are determined. New received signal levels are computed for all WTRUs 26, step 114. The transmit power of the new WTRU 26 is redetermined, step 116. The estimation of the transmit power level may take into account factors of the adaptive system, such as the resulting beam width. Steps 114 and 116 are repeated until they converge or there is little change, step 118. The slot with the lowest total received signal level is selected, step 120.

Figure 15:
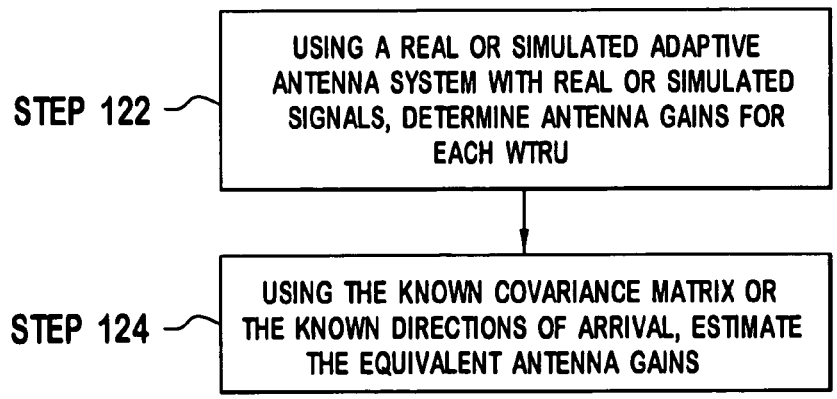
FIG. 15 is a flow chart for determining antenna gains.

Estimating the performance of adaptive antennas can also be performed prior to receiving of signals. In several of the above embodiments, it is necessary to estimate the performance of an adaptive antenna receiving or transmitting system prior to actual receiving of all signals. As a result, an adaptive antenna algorithm can not be used to compute weights and derive antenna gains. An alternate approach is as follows per the flow chart of FIG. 15.

A real or simulated adaptive antenna system with the same number of antennas as the actual system is used with real or simulated signals to determine the antenna gains for each WTRU 26, step 122. Typically, an NM by NM matrix is formed. N is the number of WTRUs 26 and M is the maximum number of paths per WTRU 26. A neural network of size $(NM)^2$ is trained using the known covariance matrix or the known directions of arrival and the antenna gain. The neural net provides an estimate of the equivalent antenna gains, step 124.

What is claimed is:

1. A method for assigning slotted code division multiple access time slots by a controller using a plurality of fixed beams, the method comprising for a given user:

measuring a quality of each fixed beam based on a received signal power of each fixed beam;

measuring a quality of each timeslot in each fixed beam based on an interference measurement of each timeslot;

calculating, by the controller, a modified interference measure for each timeslot by applying a weighting factor to a timeslot interference measurement and a beam received signal power and combining a weighted timeslot interference measure with a weighted beam received power measure;

ranking, by the controller, all modified interference measures; and assigning, by the controller, a plurality of timeslots to the given user, wherein the plurality of timeslots are associated with the ranked best modified interference measures and at least one of the assigned timeslots is located in a different beam than at least one of the other assigned timeslots.

2. The method of claim 1 wherein ranking the modified interference measures uses a pathloss measurement for each slot.

3. A method for assigning slotted code division multiple access time using a plurality of fixed beams by a controller, the method comprising for a given user:

selecting at least one fixed beam;

measuring a quality of each selected fixed beam based on a received signal power of each fixed beam;

measuring a quality of each timeslot in each selected fixed beam based on an interference measurement of each timeslot;

calculating a modified interference measure for each timeslot by applying a weighting factor to a timeslot interference measurement and a beam received signal power and combining a weighted timeslot interference measure with a weighted beam received power measure;

ranking, by the controller, all of the modified interference measures; and assigning, by the controller, a plurality of timeslots to the given user, wherein the plurality of timeslots are associated with the ranked best modified interference measures and at least one of the assigned timeslots is located in a different beam than at least one of the other assigned timeslots.

4. The method of claim 3 wherein a selected number of ranked fixed beams is two.

5. The method of claim 3 wherein a selected number of ranked fixed beams is a predetermined number.

6. The method of claim 3 wherein a selected number of ranked fixed beams includes all available fixed beams.

7. The method of claim 3 wherein a selected number of ranked fixed beams is a number of fixed beams exceeding a predetermined quality threshold.

* * * * *

UNITED STATES PATENT AND TRADEMARK OFFICE
CERTIFICATE OF CORRECTION

PATENT NO.       : 7,602,760 B2                               Page 1 of 1
APPLICATION NO.  : 10/437164
DATED            : October 13, 2009
INVENTOR(S)      : Eldad Zeira It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1378 days.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

PATENT NO.        : 7,602,760 B2
APPLICATION NO.   : 10/437164
DATED             : October 13, 2009
INVENTOR(S)       : Eldad Zeira It is certified that error appears in the above-identified patent and that said Letters Patent is hereby corrected as shown below:

At column 5, delete Equation 1 and insert therefor -- $I_{ns}' = (1-\alpha)I_{ns} + \alpha(R_k - R_n)$ --.
4
At column 6, delete lines 51-60, and insert therefor
-- The transmit power required by each WTRU 26 (node) is determined to satisfy the signal to interference (SIR) requirements of that node's physical channels. For a WTRU k ($k = m_{j-1} + 1, 2, \ldots, m_j$) connected to base station j ($j = 1, 2, \ldots, N$), its SIR level, $SIR_k(\xi)$, is expressed per Equation 2.

$$SIR_k(\xi) = \frac{L_{kj} \cdot G_{kj} T_u(k)}{N_0 + \sum_{h=1, h \in \Omega(j)}^{m_N} L_{hj} G_{hj} \cdot T_u(h) + \alpha \sum_{h=1, h \in \Omega(j), h \neq k}^{m_N} L_{hj} G_{hj} T_u(h)}$$ --.

At column 7, delete Equation 3, and insert therefor -- $T_u \cdot A = S(\xi)$ --.

At column 7, delete lines 16-35, and insert therefor
-- A is an $m_N$ by $m_N$ matrix. In matrix A, each diagonal element $A_{kk}$ ($1 \leq k \leq m_N$) is per Equation 4.

$A_{kk} = L_{kj}$ ($k \in \Omega(j), j = 1, 2, \ldots, N$)       Equation 4

Each non-diagonal element, $A_{kl}$ ($k \neq l$, $1 \leq k$, $1 \leq m_N$), is per Equation 5.

$$A_{kl} = \begin{cases} -\alpha \, SIR_k L_{lj} G_{lj}, & k \in \Omega(j), l \in \Omega(j) \\ -SIR_k \cdot L_{lj} G_{lj}, & k \in \Omega(j), l \in \Omega(h), j \neq h \end{cases}$$       Equation 5

$T_u$ is a 1 by $m_N$ matrix and is per Equation 6.

$$T_u = \begin{bmatrix} T_{u1} & T_{u2} & \cdots & T_{um_N} \end{bmatrix}$$       Equation 6

$S(\xi)$ is a 1 by $m_N$ matrix per Equation 7.

$$S(\xi) = \begin{bmatrix} SIR_1 \cdot N_0 & SIR_2 \cdot N_0 & \cdots & SIR_{m_N} \cdot N_0 \end{bmatrix}$$       Equation 7

Signed and Sealed this
First Day of February, 2011

David J. Kappos
*Director of the United States Patent and Trademark Office*

CERTIFICATE OF CORRECTION (continued)

The transmit power is determined per Equation 8.

$$T_u = S(\xi) \cdot A^{-1} \quad \text{Equation 8 --.}$$

At column 7, delete Equation 9 and insert therefor $$I_j = \sum_{h=1, h \in \Omega(j)}^{m_N} L_{hj} G_{hj} \cdot T_u(h) \quad \text{Equation 9 --.}$$

At column 7, delete Equation 10 and insert therefor $$\bar{I} = (1/N) \sum_{n=1}^{N} I_n \quad --.$$

At column 9, delete Equation 11 and insert therefor $$SIR_k(\xi) = \frac{L_{kj} \cdot G_{kj} T_D(j,k)}{N_0 + \sum_{h=1, h \neq j}^{m} L_{kh} \cdot \sum_{l \in \Omega(h)} G_{hl} T_D(h,l) + \alpha L_{kj} \sum_{l \in \Omega(j), l \neq k}^{m_N} G_{jl} T_D(j,l)} \quad --.$$

At column 9, delete lines 29-34, and insert therefor $$-- T_u \cdot B = S'(\xi) \quad \text{Equation 12}$$

B is an $m_N$ by $m_N$ matrix. In matrix B, each diagonal element, $B_{kk}(1 \leq k \leq m_N)$, is per Equation 13.

$$B_{kk} = G_{kj} L_{kj}, \; k \in \Omega(j), \; j=1,2,\ldots,N \quad \text{Equation 13 --.}$$

At column 9, delete lines 35-54, and insert therefor

-- Each non-diagonal element, $B_{kl}$ ($k \neq l$, $1 \leq k$, $1 \leq m_N$) is per Equation 14.

$$B_{kl} = \begin{cases} -\alpha SIR'_k L_{kj} G_{kj}, & k \in \Omega(j), l \in \Omega(j), k \neq l \\ -SIR'_k \cdot L_{kh} G_{kh}, & k \in \Omega(j), l \in \Omega(h), h \neq j \end{cases} \quad \text{Equation 14}$$

$T_D$ is a 1 by $m_N$ matrix and is per Equation 15.

$$T_D = [T_D(1,1) \quad T_D(1,2) \quad \cdots \quad T_D(N, m_N)] \quad \text{Equation 15}$$

$S'(\xi)$ is a 1 by $m_N$ matrix and is per Equation 16.

$$S'(\xi) = [SIR'_1 \cdot N_0 \quad SIR'_2 \cdot N_0 \cdots SIR'_{m_N} \cdot N_0] \quad \text{Equation 16}$$

CERTIFICATE OF CORRECTION (continued)
U.S. Pat. No. 7,602,760 B2

Since the matrix B will always have a full rank, an inverse matrix B exists. Accordingly, the transmit power is determined per Equation 17.

$$T_D = S'(\xi) \cdot B^{-1} \qquad \text{Equation 17} \text{ --.}$$

At column 10, delete Equation 18 and insert therefor $$I_k = \sum_{h=1, h \neq j}^{N} L_{kh} \cdot \sum_{l \in \Omega(h)} G_{hj} T_D(h,l) \qquad \text{Equation 18} \text{ --.}$$

At column 10, delete lines 14 -17, and insert therefor $$\bar{I} = (1/m_N) \sum_{k=1}^{m_N} \eta_k I_k \qquad \text{Equation 19}$$

$\eta$ is a weight factor preferably determined by priority. --.